(12) United States Patent
Schnorrer

(10) Patent No.: US 6,779,944 B2
(45) Date of Patent: Aug. 24, 2004

(54) CLAMPING DEVICE FOR ALIGNING AND CLAMPING TWO PIPE ENDS

(75) Inventor: Walter Schnorrer, Anker Engelunds Vej 6, 9200 Aalborg SV (DK)

(73) Assignee: Walter Schnorrer, Alaborg SV (DK)

( * ) Notice: Subject to any disclaimer, the term of this patent is extended or adjusted under 35 U.S.C. 154(b) by 15 days.

(21) Appl. No.: 10/237,189

(22) Filed: Sep. 9, 2002

(65) Prior Publication Data

US 2003/0047650 A1 Mar. 13, 2003

(30) Foreign Application Priority Data

Sep. 7, 2001 (EP) .............................................. 01121462

(51) Int. Cl.[7] ................................................ B25G 3/20
(52) U.S. Cl. ................. 403/374.2; 403/373; 403/374.1; 403/374.3; 403/374.4; 403/367; 285/420
(58) Field of Search .............................. 403/374.2, 373, 403/374.1, 374.3, 374.4, 367, 368, 369, 370, 278; 205/397, 420, 370, 334.2, 341, 64, 373, 15; F16L 3/00, 17/00

(56) References Cited

U.S. PATENT DOCUMENTS

| 2,508,039 | A | * | 5/1950 | Neuwirth ................. 248/188.5 |
| 2,777,048 | A | * | 1/1957 | Kocks ......................... 219/161 |
| 2,993,254 | A | * | 7/1961 | Larson ......................... 24/569 |
| 3,009,747 | A | * | 11/1961 | Pitzer ......................... 384/272 |
| 3,434,303 | A | * | 3/1969 | Leyer ......................... 464/71 |
| 3,717,367 | A | * | 2/1973 | Peter et al. ................. 403/356 |
| 3,770,927 | A | * | 11/1973 | Christopher ................ 219/611 |
| 3,912,412 | A | * | 10/1975 | Struttmann ................. 403/368 |
| 4,134,703 | A | * | 1/1979 | Hinners ...................... 403/104 |
| 4,405,075 | A | * | 9/1983 | Roddy ....................... 228/49.3 |
| 4,582,551 | A | * | 4/1986 | Parkes et al. ................ 156/94 |
| 5,274,888 | A | * | 1/1994 | Payne ......................... 24/277 |
| 5,398,862 | A |   | 3/1995 | Aleman |
| 5,538,173 | A |   | 7/1996 | Hummel |
| 5,609,291 | A | * | 3/1997 | Hummel ..................... 228/212 |
| 6,289,636 | B1 | * | 9/2001 | White et al. .................. 52/40 |

FOREIGN PATENT DOCUMENTS

| DE | 367095 | * | 2/1923 |
| DE | 90 05 893 |   | 10/1990 |

* cited by examiner

Primary Examiner—Robert J. Sandy
Assistant Examiner—Carlos Lugo
(74) Attorney, Agent, or Firm—Morrison & Foerster LLP

(57) ABSTRACT

The invention relates to a clamping device set for aligning and clamping two pipe ends, with clamping plates (1) which are arranged axially distanced, with clamping wedges (2) which extend in axial direction and which on a first side (21, 23) are mounted movable in radial direction on the clamping plates, and on a second side (22) have a contact surface for acting on the pipe ends (91, 92), with a guide for guiding the clamping wedges (2) on the clamping plates (1) and with an actuation means (3) for moving the clamping wedges (2), wherein the guide (4) is provided with an elastic holding means for holding the clamping wedges (2) on the clamping plates (1). The invention extends further to a clamping device set with several sets of exchangeable clamping wedges (2) which have differing distances from the inner to the outer side (21, 22).

20 Claims, 5 Drawing Sheets

CLAMPING DEVICE FOR ALIGNING AND CLAMPING TWO PIPE ENDS

Figure 1:
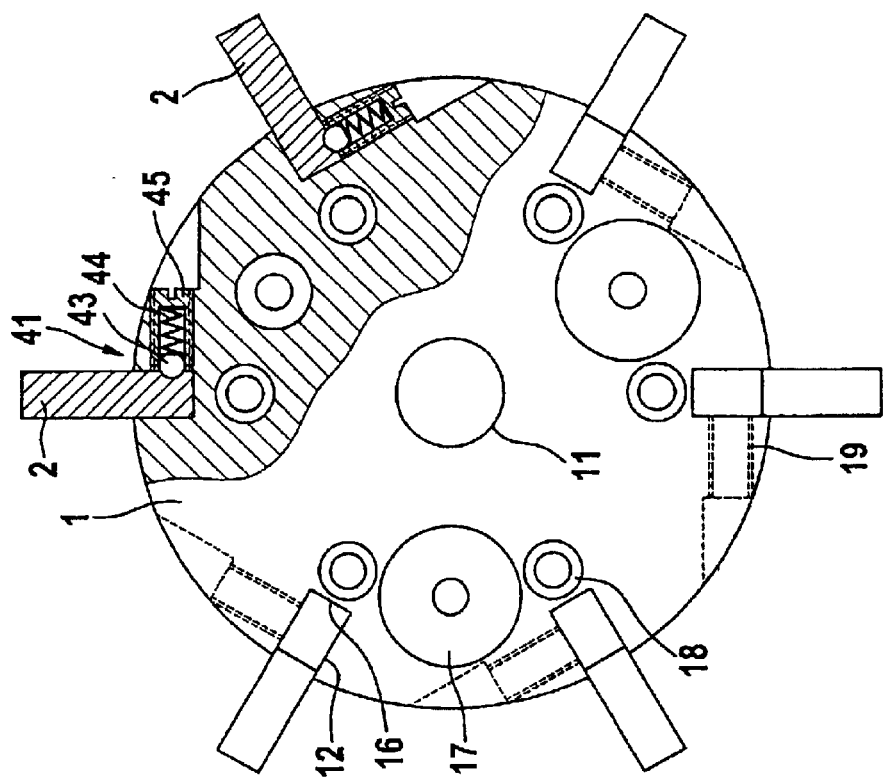
Figure 1:
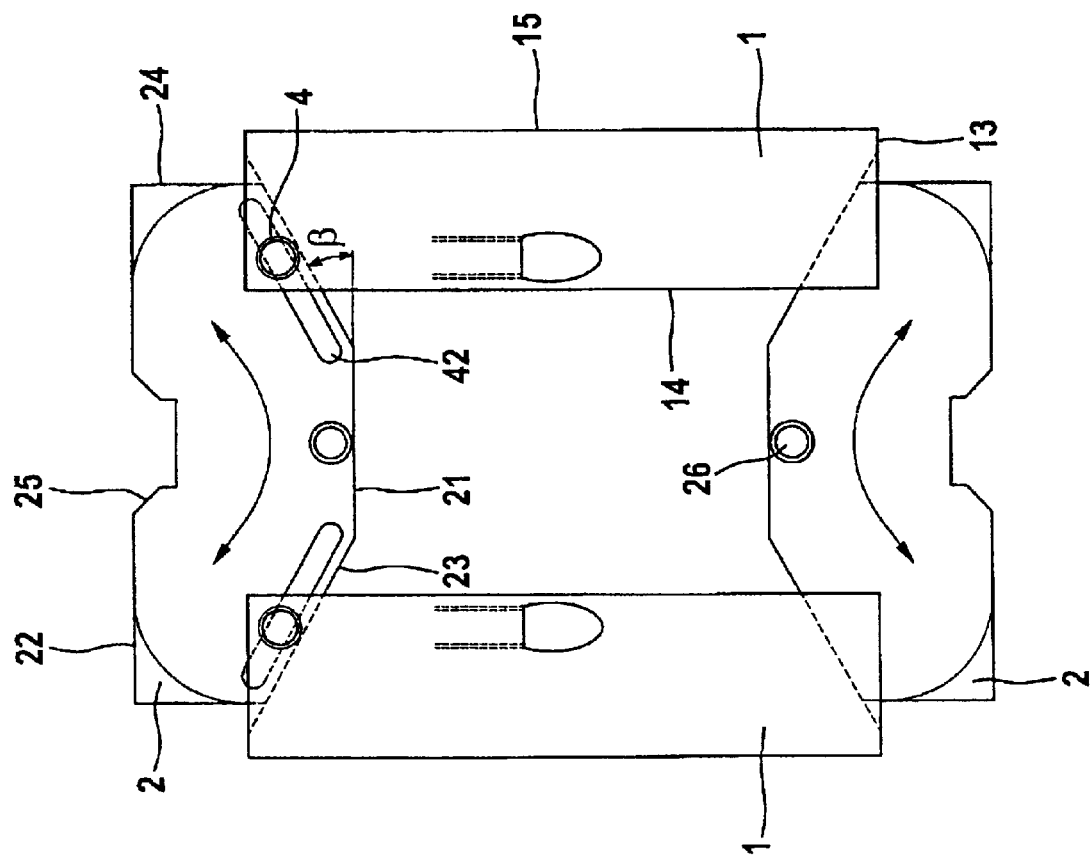

The invention relates to a clamping device for aligning and clamping two pipe ends with clamping plates which are arranged axially distanced, with clamping wedges extending in axial direction and which on a first side in radial direction are movably mounted on the clamping plates, and on a second side have a contact surface for acting on the pipe ends, with a guide for guiding the clamping wedges on the clamping plates and with an actuation means for moving the clamping wedges. The invention extends further to a clamping device set with several sets of exchangeable clamping wedges which have differing distances from the inner to the outer side.

For welding tubes it is necessary for the bordering ends of the tubes to be welded to be aligned to one another in a certain manner and held in this position. An ovality of the tubes which is often present would at the same time be alleviated as much as possible. In order to simplify the alignment and firm holding of the pipe ends in the desired position, there are basically two possibilities. The one possibility is to use clamping devices which on the inside or outside are attached to the pipe ends to be welded and which may be rigidly clamped to the ends of the tubes by moved clamping elements. Various embodiments of such clamping devices are known, which either in each case clamp only one pipe end so that two clamping devices are required, or which clamp both pipe ends.

The second, more oftenly used possibility is to hold the pipe ends after alignment in the desired position not by a special clamping device but by binding the two pipe ends to one another by a certain number of welding points and thus by fixing their mutual alignment. This possibility which is largely carried out by hand is above all applied when the ends of the pipe are to be welded to one another with a particularly high accuracy, and this is further effected under unfavourable conditions, such as in the offshore field. The disadvantage of this is that the quality fluctuates greatly. Often one achieves only very poor welding results. Clamping tools with clamping plates and clamping wedges are furthermore also known from the field of metal machining. Such clamping tools are for example used with milling for machining tubes. The miller is anchored in the pipe by way of the clamping tool inserted at one end of the tube. Similar clamping tools are also known with lathes. Common to all these is the fact that they are only designed for clamping one pipe end, and not for clamping and mutual alignment of two pipe ends, as is required when welding two pipe ends.

The disadvantage of the known clamping devices is the fact that the known clamping devices do not permit the achievement of the demanded accuracy. The manual alignment and clamping of the pipe ends by way of weld-binding is time consuming and expensive, in particular given poor environmental conditions.

It is therefore the object of the invention to provide a clamping device of the initially mentioned type, which permits a more simple and accurate clamping of two pipe ends.

The solution according to the invention lies in a welding device with the features of claim 1 as well as a clamping device set with the features of claim 15. Advantageous further formations are specified in the dependent claims.

Firstly some used terms are to be explained once:

A clamping device is to be understood as a device which serves for mutually aligning and holding two pipe ends in position with or without associated fittings or shape parts. As a rule the device at the same time is designed to align the pipe ends coaxially; however also other alignment types are conceivable, e.g. at a certain angular displacement to the respective middle axis of the two tubes.

Clamping plates are to be understood essentially as disk-shaped or annular elements which serve for mounting and for guiding the clamping wedges. With a clamping device which is designed for clamping on the pipe inner surface, the clamping plates are designed such that they may be introduced into the pipe ends; with a clamping device which is designed for clamping on a pipe outer surface, the clamping plates are designed such that they may be pushed over the pipe ends. The clamping plates although having usually a round shape, may also have a shaping which is dependent on the shape of the pipe ends which are to be welded to one another. Thus for example with clamping devices for welding square tubes it may be designed rectangular or square.

Elastic holding means is to be understood as a means which comprises at least one elastic element which may exert forces onto another component. With the elastic element it may be the case of such an element which obtains its elasticity essentially from its shaping, for example a spiral spring, or which obtains its elasticity from its material properties, such as for example rubber.

According to the invention with a clamping device of the initially mentioned type it is also envisaged to provide the guide with an elastic holding means for holding the clamping wedges on the clamping plates. By way of the elastic holding means it is achieved that with the clamping device according to the invention the pipe ends to be welded to one another may also be clamped with the required accuracy and security when the clamping device is not exactly aligned on the pipe ends but assumes an incorrect position, for example is arranged slightly tilted. The elastic holding element gives the clamping wedges within the guide a certain movability with respect to the clamping plates, so that the clamping wedges inspite of the incorrect position of the clamping device bear securely on the pipe ends and then finally allows these to be aligned and clamped. Thanks to it elasticity, although the holding means attempts to keep the clamping wedges in their normal position with respect to the clamping plates, it however when appropriate allows the clamping wedges to assume a position deviating from the normal position in order thus to compensate errors which result from a tilted arrangement of the clamping device in the pipe ends or resulting from other inaccuracies. A further advantage of the elastic holding means according to the invention is the fact that it has a loss-preventing effect. The loss-preventing effect is based on the fact that the elastic holding means attempts to hold the clamping wedges in their normal position to the clamping plates. It therefore counteracts undesired movements of the clamping wedges with respect to the clamping plates and thus holds the clamping wedges on the clamping plates.

It is surprising that on the one hand with the elastic holding means according to the invention the clamping wedges may be given a certain degree of freedom with respect to the clamping plates for compensating alignment errors, such as for example tiltings, without worsening the security and accuracy of the guiding of the clamping wedges on the clamping plates.

Preferably the elastic holding means comprises a spring-loaded ball, which is arranged on one of the two, the clamping plate or the clamping wedges in order to cooperate with the other of the two, the clamping wedges or the clamping plate. The ball impinged by a spring with force exerts a holding force by way of which the clamping wedge is held on the clamping plates. This force is usefully dimensioned such that on the one hand it is sufficiently high to hold the clamping wedges on the clamping plates, but on the other hand with the occurrence of greater forces, as occur when clamping the clamping device in the tilted position, is overcome and thus permits a movement of the clamping wedges out of their normal position.

Often it is the case that the spring-loaded ball is arranged on the clamping plates and acts on a surface of the clamping wedge; one may however also reversely envisage for the spring-loaded ball to be arranged on the clamping wedges and to act on the surface of the clamping plate.

Usefully the elastic holding means comprises a deepening which is arranged on the one of the two, the clamping wedges or the clamping plate, and which cooperates with the spring-loaded ball. The deepening together with the spring-loaded ball forms a positive fit which permits a more secure holding of the clamping wedges on the clamping plates than with friction forces on their own. Furthermore by way of the shape of the deepening one may set a movement path for the guiding of the clamping wedges on the clamping plates. It is particularly advantageous to design the deepening as a channel. The clamping wedges may then be led along this movement path (normal position) without a significant counterforce by the elastic holding means.

Usefully a hollow bolt is provided as a bearing for the spring-loaded ball. The hollow bolt permits a particularly simple mounting of the ball as well as of the spring impinging the ball with force. Furthermore the hollow bolt permits a simple adjustment of the bias of the spring and thus of the holding force of the spring-loaded ball.

Preferably the guide is designed on the manner of guide grooves, whose groove base forms an oblique surface. Grooves permit a particularly simple and useful manner of guiding the clamping wedges on the clamping plates. The oblique surface which usefully cooperates with a counter oblique surface on the guided element, as a rule clamping wedges, determines the relation of the movement between the clamping plates and the clamping wedges. By way of changing the axial distance of the clamping plates the oblique surface permits the movement of the clamping wedges in the radial direction. Its angle determines the ratio of these two movements and the force transmission ratio between the force which must be mustered for moving the clamping plates towards one another or away from one another, and the spreading force of the wedge plates.

Usefully in the region of the guide grooves there is provided a tangential bore for accommodating the spring-biased ball, which with its one end ends in the guide groove and with its other end on the circumferential surface of the clamping plates. With such a tangential bore there is formed a particularly space-saving and simply manufacturable receiver for the spring biased ball and where appropriate the hollow bolt. By changing the position of the hollow bolt in the bore, for example by rotation, in a simple manner a change in the spring bias and thus of the holding force exerted by the ball may be carried out.

Preferably the clamping wedges consist of a copper-chrome-nickel alloy. This alloy has favorable friction properties so that no lubrication between the clamping plates and the clamping wedges is required. By way of this the construction of the clamping device is simplified considerably, also in operation there result considerable simplifications on account of this. They may however also consists of other materials, in particular stainless steel, titanium, bronze and alloys.

Usefully on the outer end faces of the clamping plates there are arranged sealing means which are designed for the sealing cooperation with surfaces of the pipe ends. By way of these sealing means the space located between them with the clamping device is separated off from the remaining inside of the pipe in a gas-tight manner. By way of this one prevents the access of damaging gases, for example atmospheric oxygen, from the inside of the pipe to the welding location between the pipe ends. By way of this one may achieve a better welding result.

Preferably there is provided a forming gas conduit on at least one of the clamping plates in order to conduct supplied forming gas into the region between the clamping plates. The forming gas serves for the further improvement of the surrounding conditions at the welding location, in particular for creating a protective gas atmosphere. The forming gas conduits integrated into the clamping plates permit a particularly simple, reliable and low-loss supply of forming gas.

Usefully there is provided a connection plate with a connection and with a passage opening for the forming gas to be supplied, which via an annular channel is in connection with the forming gas conduit of the clamping plate. With the separate connection plate a particularly simple and universal connection for the forming gas is possible. Thanks to the annular channel the connection plate may lie at any angular position with regard to the clamping plate so that it becomes possible to rotate the connection plate with respect to the clamping plate also in operation of the clamping device. Furthermore the annular channel has the advantage that with only one connection on the connection plate one may supply a plurality of forming gas conduits in the clamping plate, inasmuch as the forming gas conduits are arranged on a circular path.

Usefully there is provided at least one bleed opening on one of the clamping plates, preferably on the one without a forming gas guide. By way of the bleeding opening excess forming gas may be led away out of the space between the two sealing means. By way of this it is avoided that an undesirable excess pressure arises in the space between the sealing means and thus at the welding location on account of the supplied forming gas.

Usefully the actuation means is designed for moving the clamping edges. Alternatively they may also be designed hydraulically. The actuation means does not need to act directly on the clamping wedges. With a tried and trusted embodiment form it rather acts on the clamping plate whose movement is then transmitted onto the clamping wedges via the guide.

According to a particularly preferred embodiment form of the invention which where appropriate is also to enjoy independent protection, one provides a spreader ring consisting of at least two segments whose outer circumferential surface comprises a peripheral pressure saddle. In such a spreader ring the pipe surface in the region in which the welding seam is to be attached may be pressed in slightly in order thus to widen the pipe in the region of the later welding seam. The widening of the pipe in this region has the advantage that the full width of the pipe may also be maintained when the pipe contracts after the competed welding, in particular in the region of the welding seam. Without any previously carried out widening it may occur that then in this region the width of the pipe is restricted; if however a widening of the pipe in this region has been carried out with the spreader ring, then the pipe also after welding has the full width in the region of the welding seam. A further surprising advantage of the widening lies in the fact that by way of this it is indeed in the critical region of the welding location that a possible ovality of the pipe ends may be prevented. At the same time the widening may be relatively slight, according to pipe thickness an amount of 0.1–0.4 mm is completely sufficient. However one may also widen by a greater amount, one may even achieve up to 1.5 mm with a mechanical actuation means without difficulty. The spreader ring may be designed such that it may either be placed on the clamping wedges, or when the clamping wedges are omitted, it may be assembled directly between the clamping plates, which then only have a small distance to one another. By way of activating the actuation means the clamping plates move towards one another, by which means the segments of the spreader ring, indirectly via the clamping wedges or directly in the radial direction, is forced against the pipe surface in order to widen this. This widening is only required in the direct vicinity of the welding location in order to keep the forces required for the widening small, the pressure saddle only has a relatively slight extension of a few mm, preferably about 4–8 mm in the axial direction.

Usefully the spreader ring on its inner circumferential surface comprises bevellings. With these bevellings it is possible for the spreader ring to be arranged directly between the clamping plates and for these to directly cooperate with the spreader ring, that is to say without the clamping wedges arranged therebetween. Usefully, the clamping plates, on their edge envisaged in each case to cooperate with the clamping wedges, comprise a chamfer whose angle preferably corresponds to the bevelling. By way of this chamfer a particularly good bearing of the clamping plate on the spreader ring is achieved. The chamfer at the same time extends over a smaller region than the depth of the slot accommodating the clamping wedges so that between the slots there remains sufficient material in the clamping plate for the secure guiding of the clamping wedges. By way of the bevelling on the inner circumferential surface of the spreader ring and the chamfer on the clamping plate at the same angle, in an advantageous manner it is achieved that the clamping plates with the spreader ring form an independent system which is independent of the clamping wedges. Thus the angle of the bevelling or chamfer may be selected independently of the angle of the oblique surface in the guide groove so that there results a different force transmission ratio between the force of the actuation means acting axially on the clamping device and the radially acting pressing force resulting therefrom on the one hand and the clamping force on the other hand. Preferably the angle of the bevelling or chamfer is smaller than that of the oblique surface of the guide grooves so that one achieves a force transmission ratio which is as high as possible. This has the advantage that with an unchanged actuation means one may achieve high spreading forces in order thus also to be able to widen tubes with a relatively large wall thickness.

The invention further relates to a clamping device set for aligning and clamping pipe ends in various sizes, with clamping plates which are arranged axially distanced, with clamping wedges which extend in the axial direction and which on a first side are movably mounted on the clamping plates in the radial direction and on a second side have a contact surface for acting on the pipe ends, with a guide for guiding the clamping wedges and with an actuation means for moving the clamping wedges, characterized in that the guide is provided with an elastic holding means for holding the clamping wedges on the clamping plates, wherein the clamping wedges are exchangeable and several sets of clamping wedges are provided which have different distances from the inner to the outer side. Furthermore they may consist of different material.

By way of the fact that the clamping wedges are exchangeable, and several sets of clamping wedges are present which differ in their dimensions, an adaptation of the clamping device to the respective dimensions of the pipe ends to be welded to one another may be carried out. If two pipe ends with a small diameter are to be welded to one another, then from the sets of clamping wedges one may select and apply in the clamping device a set of clamping wedges which has a fitting small distance from the first side on the side of the clamping plate to the tube-side second side. If one is to weld a pair of pipe ends with a larger diameter to one another, then one selects and uses a set of clamping wedges which has correspondingly large dimensions. By way of this there results a greater range of application of the clamping device according to the invention with regard to the pipe sizes which may be welded. By way of a simple exchange of the set of clamping wedges an adaptation to different pipe diameters may be effected.

Usefully the clamping wedges are designed multi-piece with a sliding piece on the side of the clamping plates and an attachment piece on the side of the tube, wherein the attachment piece is exchangeable and there is provided a set of attachment pieces of different sizes. As has been shown, is not completely necessary to exchange the clamping wedges as a whole, but it may be sufficient to change the part of the clamping wedge which determines the distance of the edge on the side of the clamping plate to the tube-side edge. This has the advantage that on exchange the clamping wedges are not taken out of their guides on the clamping pates and the new one replaced therein. It is sufficient to place another attachment piece onto the sliding piece remaining in the guides on the clamping plates. Usefully there is provided a quick-closure for the connection of the attachment pieces on the sliding pieces.

Figure 2:
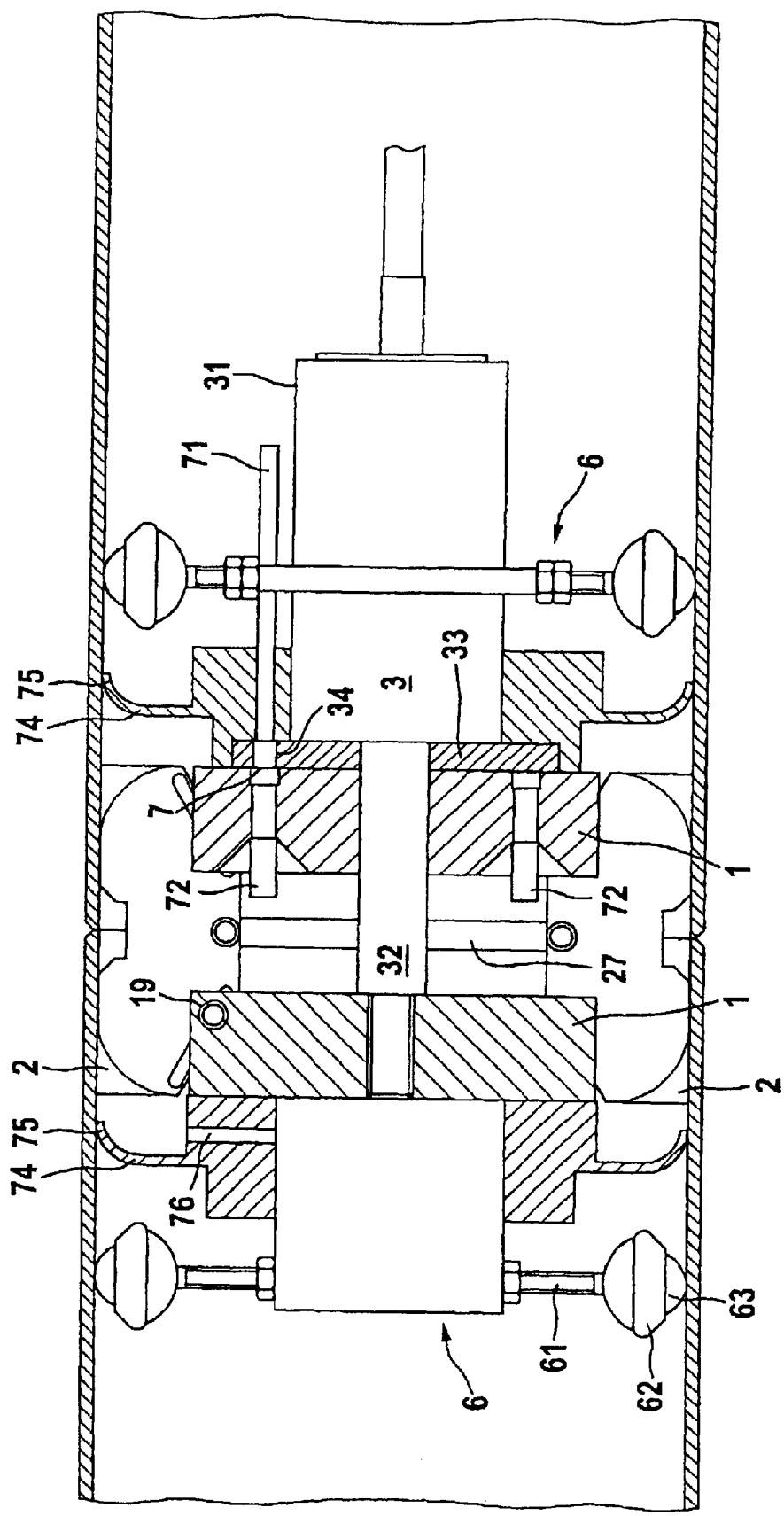
Figure 3:
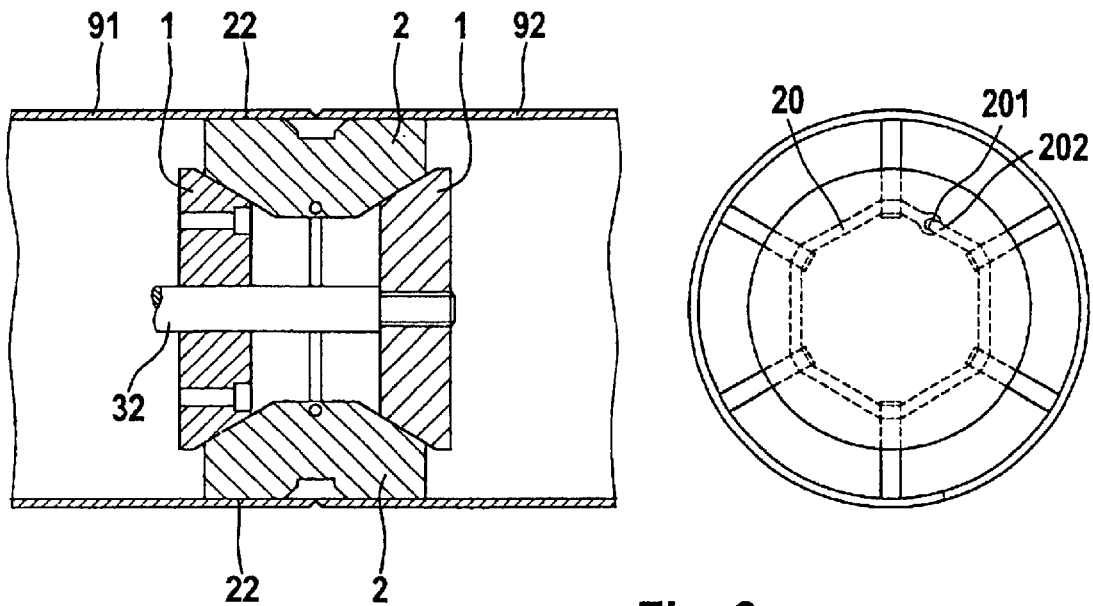
Figure 4:
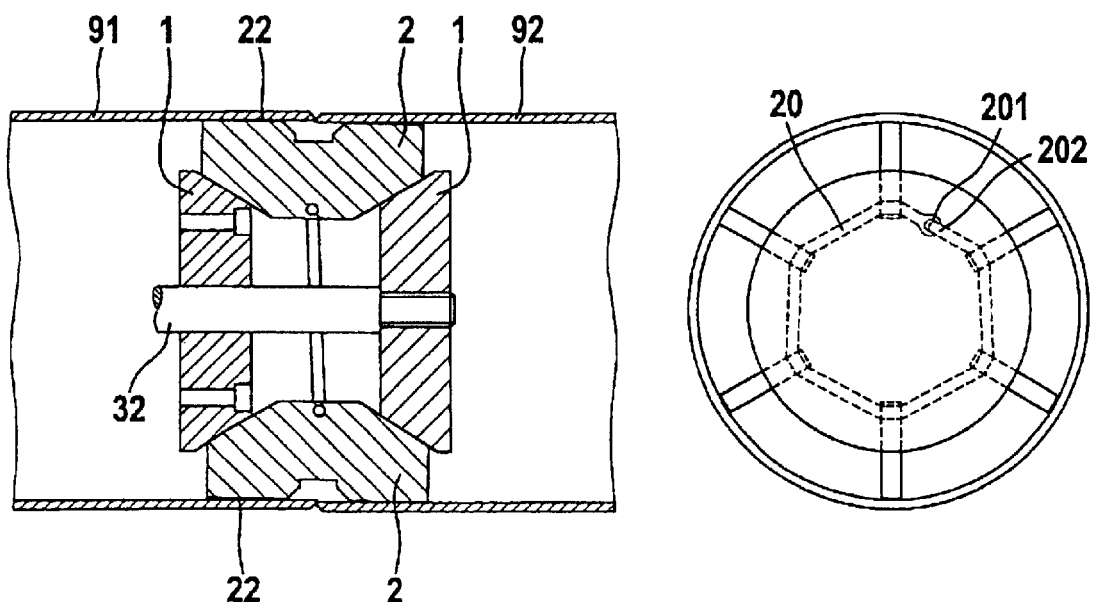
Figure 6:
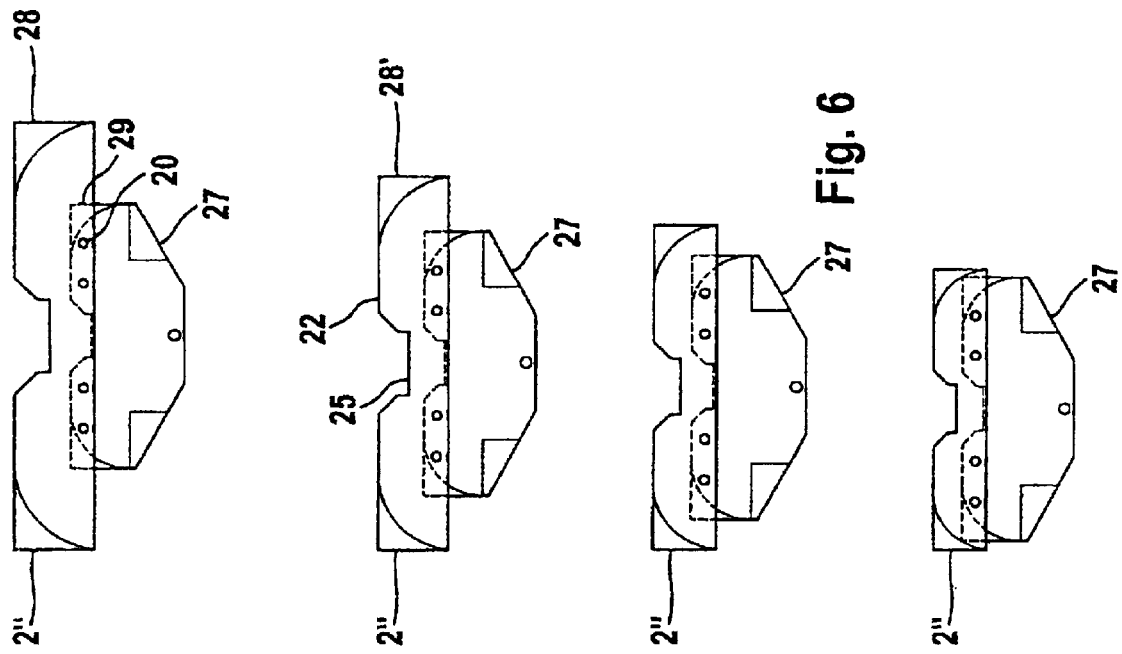
Figure 5:
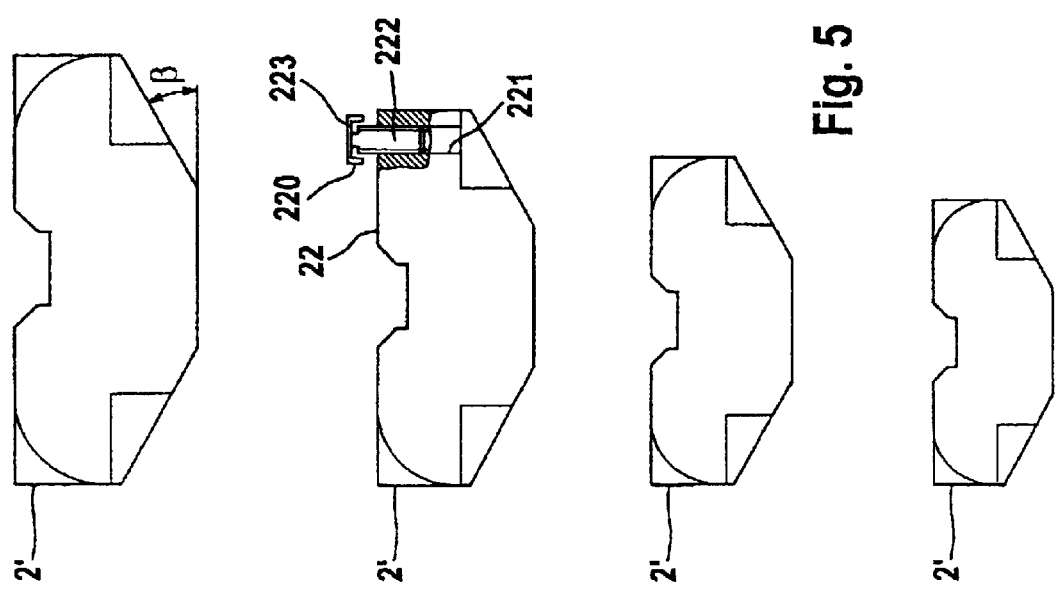
Figure 7:
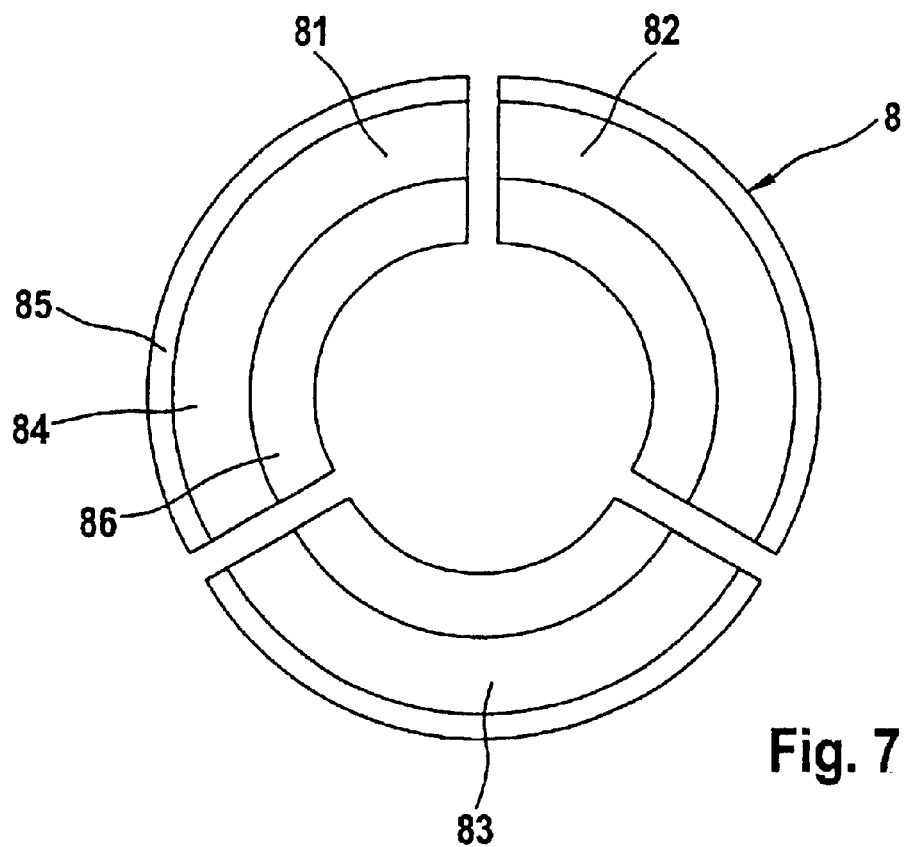

The invention is hereinafter described with reference to the accompanying drawings, in which there are shown advantageous embodiment examples of the present invention. There are shown in FIG. 1 a lateral view and a plan view partly in section of an embodiment example of the present invention;

FIG. 2 a sectional view of a clamping device according to the embodiment example of the invention, inserted into a pipe pair;

FIG. 3 a sectional view of the clamping device according to the invention, in a normal position in a pipe pair;

FIG. 4 a sectional view of the clamping device according to the present invention in an incorrect position in a pipe pair;

FIG. 5 a representation of a set of clamping wedges;

FIG. 6 a representation of a further clamping wedge set with an exchangeable clamping shoe;

FIG. 7 a representation of a spreader ring; and

FIG. 8 a sectional view of the spreader ring in the assembled condition.

The clamping device according to the invention in the shown embodiment example comprises two clamping plates 1, a set of six clamping wedges 2 as well as an actuation means 3. One may also envisage a different number of clamping wedges 2, preferably between three and twenty depending on the pipe inner diameter. The clamping plates 1 are arranged at an axial distance to one another along a common axis formed by the actuation means 3. Each of the two clamping plates 1 comprises an inner end face 14 facing the respective other clamping plate as well as an outer end face 15 facing away to the outside.

On the circumferential surfaces 13 of the clamping plates 1 there are arranged a plurality of grooves 12, which with the shown embodiment example are arranged uniformly at an angular distance of 60°. The grooves 12 extend over a part of the circumferential surface 13 as well as over a part of the inner end-face 14 in a manner such that their groove base 16 is not aligned parallel to the common axis of the clamping plates 1, but is slanted in a cone-like manner in the radial direction by an angle β. In their center the clamping plates further comprise a plurality (six in the shown embodiment example) of bores 18 for flange screws. Furthermore in one of the two clamping plates 1 there are provided a plurality of (three in the shown embodiment example) gas lead-throughs 17.

The clamping wedges 2 are arranged in a bridge-like manner between the two clamping plates 1. The clamping wedges 2 are of an approximately trapezoidal shape with a shorter inner edge 21 and a longer outer edge 22. Connecting to the two ends of the inner edge 21 there is in each case an oblique edge 23 which finally leads to the outer edge 22 via in each case an end-face edge 24. The oblique edge 23 is inclined by the same angle β with respect to the inner edge 21 with which the oblique groove base 16 is inclined with respect to the axis direction. In the middle of the outer edge 22 there is provided a relief 25 roughly in the region in which the ends of the pipes clamped by the clamping device are to be welded to one another. Lying opposite this roughly in the middle of the inner edge 21 there is provided a receiving opening 26 for a tension spring 20.

In the assembled condition of the clamping device the clamping wedges 2 with their oblique edge 23 are applied into the grooves of the clamping plates. At the same time the oblique edges 23 rest on the groove base 16 of the grooves 12 in an essentially flat manner thanks to both equal inclinations about the angle γ. With this arrangement, with a relatively large axial distance between the two clamping plates 1, it is achieved that the clamping wedges 2 with their respective outer regions of the oblique edges 23 rest on the groove base 16 of the clamping plates 1, so that the outer edges 22 of the clamping wedges 2 only project beyond the circumferential surface 13 of the clamping plates 1 by a small distance; on the other hand with a relatively small axial distance of the clamping plates 1 to one another the clamping wedges 2 with their inner region of the oblique edges 23 lie on the groove base 16 of the grooves of the clamping plates, so that the clamping wedges 2 project from the circumference 13 of the clamping plates 1 by a large distance. As such by way of changing the axial distance of the clamping plates 1, the position of the clamping wedges 2 in the radial direction may be changed. The connection at the same time as described previously is such that with an approaching of the clamping plates 1 to one another, the clamping wedges 2 move radially outwards.

For changing the axial distance of the clamping plates there is provided an actuation means 3. It comprises an actuation member 31 as well as a pull rod 32. The actuation member 31 by way of fastening means which have not been represented is fastened on the end face 15 of one of the two clamping plates via a flange plate 33, with which in the embodiment example shown in FIG. 2 this is shown on the right. The actuation member 31 acts on the pull rod 32 which extends through the two center bores 11 of the two clamping plates 1 and which is fastened in a tension-proof manner on the one of the two clamping plates 1 which is farthest from the actuation member 31. Usefully for this, as is shown in FIG. 2, the two center bores 11 of the two clamping plates 1 are designed differently large. The center bore 11 of the clamping plate 1, which is closer to the actuation member 31, with the fastening flange 33 has a larger diameter which is sufficient for a passage of the pull rod 32. The center bore 11 of the clamping plate further from the actuation member 31 (in FIG. 2 the one on the left) has a smaller diameter and is provided with an inner thread for the tension-proof accommodation with an outer region of the pull rod 32 provided with an outer thread. The actuation member 31 cooperates with the pull rod 32 in a manner such that the pull rod 32 is moved either towards the actuation member 31 or away from it. By way of this the axial distance of the two clamping plates 1 to one another changes, by which means on account of the inclination by the angle β, the clamping wedges 2 move inwards or outwards. With the shown embodiment example the actuation member 31 is designed as a hydraulic control element; however also other embodiment types are conceivable, for example in the form of an electric motor acting on a threaded spindle, a pneumatic drive or a purely mechanical actuation via threaded spindles.

In order to hold the clamping wedges 2 on the clamping plates there is provided a guide 4. It comprises an elastic holding means 41 which is arranged on the clamping plate 1, as well as a guide channel 42 cooperating with this, which is arranged on the clamping wedges 2. The elastic holding means 41 comprises a locking ball 43 which is impinged by a spring 44. The elastic holding means 41 with the locking ball 43 as well as the spring 44 are in each case arranged in a bore 19 of the clamping plate 1. The bore 19 is designed on the clamping plate 1 in a manner such that, proceeding from the lower region of the grooves close to the groove base 16, it extends in the tangential direction through the clamping plate 1 until it finally exits the circumferential surface 13 of the clamping plate 1 roughly in the region between two neighboring grooves 12. The bore 19 is provided with an inner thread which is designed for accommodating a hollow bolt 45. The hollow bolt 45 with its outer thread engages into the inner thread of the bore 19 and thus may be screwed into the bore 19. In its hollow shank the hollow bolt 45 accommodates the spring 44 together with the locking ball 43. At the same time that end of the hollow space of the hollow bolt 45 which is proximal to the head forms the counter bearing for the spring 44. By way of screwing the hollow bolt 45 into the bore 19 to varying degrees, the biasing force of the spring 44 may be set with which then finally the locking ball 43 acts on the guide channel 42 of the clamping wedge 2 and then holds this firmly.

The guide channel 42 of the clamping wedges 2 runs parallel roughly over the whole region of the oblique edge 23. With this it is achieved that independently of the axial distance of the clamping plates 1 and thus of the predetermined radial position of the clamping wedges 2, the guide channel 42 is always arranged roughly at the same distance to the groove base 16 of the groove 12, so that in the normal case the locking ball 43 of the guide 4 may constantly engage into the guide channel 42 and thus holds the clamping wedges 2 on the clamping plates 1.

In this manner it is achieved that thanks to the guide 4, the clamping wedges 2 may be displaced relatively easily along their provided path on the clamping plates 1. If however the clamping wedges 2 attempt to leave the path envisaged for them, for example caused by an incorrect position of the clamping device or an ovality of the pipe end or ends, then the guide 4 counteracts the considerable resistance which may however be overcome, since for this the locking ball 43 must be moved against the force of the spring 44 out of its normal position in the guide channel 42. By way of this, on the one hand a secure guiding of the clamping wedges 2 on the clamping plates 1 is achieved, without however on the other hand completely preventing a movement of the clamping wedges 2 out of their normal position which is required with incorrect positions.

The clamping device further comprises a centering aid 6 and a forming gas means 7. The centering aid 6 consists of three spacers 61 which are arranged star-shaped and which at their outer end comprise a thickening 62 with a contact surface 63 envisaged for bearing on the inner surface of the tubes to be welded. They serve for centering the clamping device in the tubes. The forming gas means 7 comprises a supply pipe 71 which is connected to the flange plate 33 and, via a suitable bore 34 in the flange plate 33 and the openings 17 in the clamping plate on which the flange plate 33 is fastened, is led to the inner space between the two clamping plates 1. At that end of the gas openings 17 which is on the side of the inner space, there are provided sintered fine filters 72. In the flange plate there is provided an annular channel (not shown) in order with the one forming gas supply conduit 71 to supply the plurality of gas passage openings 17 with forming gas. In each case on the outer end faces 15 of the two flange plates there are arranged forming gas seals 74 which in their radial outer region are provided with sealing lips 75 for bearing onto the inner pipe surface of the pipe ends to be welded to one another. At the same time the dimension of the sealing lips 75 is selected such that they have a somewhat larger diameter than the inner diameter of the pipe ends 91, 92 to be welded to one another in order to achieve an adequate bearing of the sealing lips 75 on the inner surface of the pipe ends 91, 92. In this manner the region between the two forming gas seals 75 with the clamping device is separated in a gas-tight manner from the remaining inner space. By supplying a suitable forming gas via the forming gas supply means 7 one may thus produce a gas atmosphere which is favorable for welding. Excess forming gas may be led away via bleed channels 76.

In FIGS. 3 and 4 there is shown the application of the clamping device according to the invention. In FIG. 3 the clamping device is shown in the normal position, i.e. in the correctly aligned position. In FIG. 4 the clamping device is shown in an incorrect position, i.e. in an incorrectly aligned position. One recognizes that in FIG. 3 the two pipe ends 91, 92 to be welded to one another are aligned coaxially to one another. As such the clamping wedges 2 with their outer edge 22 are parallel to the common middle axis of the pipe ends to be welded and thus also to the clamping device. The clamping plates 1 are arranged parallel to one another perpendicular to the axial direction, i.e. arranged radially aligned. In contrast in FIG. 4 one recognizes that the clamping wedges 2 on account of the axial shifting of the pipe ends to be welded to one another are not aligned parallel to the pipe middle axis, but rather are tilted. Accordingly the clamping plates 1 are also tilted out of their normal position into one of the radial planes. As one may particularly recognize in the region of the transition between the clamping plate 1 and the lower clamping wedge 2, on account of the incorrect position, the oblique angles between the groove base 23 of the grooves 12 of the clamping plates 1 as well as the oblique edge 23 of the clamping wedges 2 no longer correspond. By way of this the clamping wedges no longer lie on the groove base 16 in a flat manner, but are deflected beyond this into an incorrect position. The guide 4 thanks to the elastic holding means permits such an incorrect position without at the same time damage occurring to the clamping device or a jamming at the guide 4 occurring. For this the locking ball 43 is moved out of the guide channel 42 against the force of the spring 44 so that the clamping wedges 2 may be tilted out of their normal position. Furthermore the guide 4 on account of its bias by the spring 44 attempts to lead back the clamping wedges 2 to their normal position. Finally by way of actuating the clamping means and the reduction of the axial distance between the clamping plates on account of the radially outwardly directed movement of the clamping wedges 2 which is effected by this actuation, one achieves a mutual alignment of the two pipe end pairs 91, 92. Furthermore the tension spring 27 in the incorrect position (see FIG. 4) is deformed with respect to the normal position (see FIG. 3) and therefore exerts an additional restoring force.

In FIGS. 5 and 6 there are shown sets of various clamping wedges 2', 2''. Of the clamping wedges which are shown in FIG. 5, in each case depending on the inner diameter of the pipe ends to be welded to one another, one selects those clamping wedges 2' which have a fitting size, and applies these into the clamping plates 1. The exchange is made simple thanks to the elastic holding means with the locking ball 43 biased by a spring 44. The clamping wedges to be exchanged may be removed by a simple pulling out of the grooves 12, whilst the clamping wedges which are to be newly applied may in a suitable manner be easily brought into the grooves 12. The achievement of the correct position of the clamping wedges 2 is simplified by the elastic holding means of the guide 4 according to the invention. According to the bias of the spring 44 the reaching of the normal position can be clearly felt and where appropriate also heard.

With the embodiment example shown in FIG. 6 the clamping wedges 2'' are designed two-piece. They consists of a sliding piece 27 and of an attachment piece 28. The sliding piece 27 is provided on the side of the clamping plate and comprises the shorter inner edge 21 as well as the oblique edges 23. The attachment piece 28 is distant to the clamping plate, i.e. provided on the side of the pipe and comprises the longer outer edge 22 for contacting the pipe inner surface with the relief 25. For fastening the attachment piece 28 on the sliding piece 27 usefully the attachment piece 28 comprises a relief 29 into which the sliding piece 27 is introduced with its outer region. In order to fasten the attachment piece 28 securely on the sliding piece 27 there are provided a plurality of fastening screws 20 which are guided through suitable bores in the region of the relief 29 of the attachment piece 28 and the corresponding outer region of the sliding piece 27.

Of the attachment pieces 28 there are provided sets in different sizes which according to requirement may be assembled onto the sliding pieces 27. The adaptation of the clamping device to the inner diameter of the pipe ends to be welded to one another with this embodiment form is thus effected in that the attachment pieces 28 are exchanged. This not only keeps the manufacturing costs for the sets small, but also permits a simple exchange of the attachments pieces 28 which are particularly prone to wear.

In order to simplify the handling of the sets of clamping wedges, the tension spring 20 which connects the individual clamping wedges of a set of clamping wedges to one another is designed openable. For this it comprises an eyelet 201 as well as a hook 202 at its respective ends which when the clamping wedges have been applied into the guide slots are connected to one another and thus represent a loss securement additionally to the guide. 4. For removing the set of clamping wedges the hook 202 only needs to be taken out of the eyelet 201, thereafter the clamping wedges 2 may be removed individually from the guide slots 12, in the removed condition the individual clamping wedges are then held on one another by the tension springs 20. With this the danger of any inadvertent detachment of one of the clamping wedges from the remaining ones is prevented.

In FIG. 7 there is shown a spreader ring 8 for the clamping device according to the invention. It is formed by segments, in the shown embodiment example three segments 81, 82, 83. Each of these segments extends over an angle of about 120° so that the three segments are pressed together roughly into a complete ring. In the spread condition the spreader ring 8 is not completely circumferential, since between the individual segments there arise gaps depending on the condition of spreading. Each of the segments 81, 82, 83 of the spreader ring 8 is manufactured of a high-strength material, such as stainless steel. Its main body 84 comprises a raised pressure saddle 85 on its outer circumferential surface, which preferably runs over the whole region of the outer circumferential surface. The pressure saddle 85 in the axial direction comprises only a relatively small extension which is a fraction of the axial extension of the main body 84 of the ring segments 81, 82, 83. Preferably the axial extension of the pressure saddle 85 is about 2–8 mm, preferably 4–6 mm. A double bevelling 86 is arranged on the inner circumferential surface of the main body 84. The bevelling 86 is inclined at an angle γ with respect to the axial direction. For emphasis the angle γ has been exaggerated in size; preferably it lies in the range of 3° to 35°, furthermore preferably at about 10°.

Figure 8A:
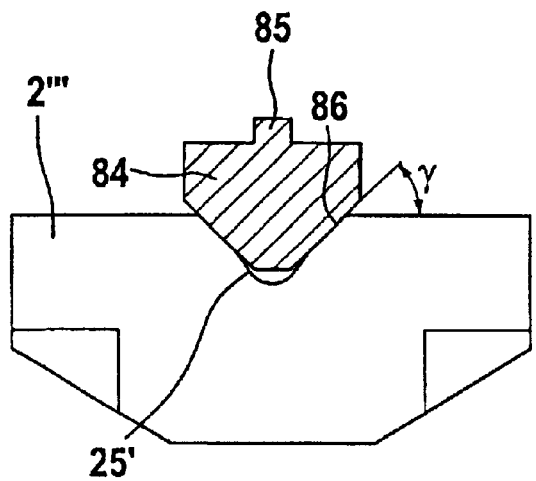

As is shown in FIG. 8a, the spreader ring 8 with its segments 81, 82, 83 is placed onto the clamping wedges 2'''. If the clamping device is actuated in the described manner, the clamping wedges 2''' move outwards in the radial direction, and with this the segments 81, 82, 83 of the clamping ring 8 also move outwards, by which means finally the pressure saddle 85 acts on the inner pipe surface and widens this. So that a sufficient space remains for accommodating the spreader ring 8, here with the applied clamping wedges 2'' it is preferably the case of those which are smaller than those clamping wedges 2 which are used for clamping the clamping device in the pipe. Preferably these clamping wedges 2''' comprise a relief 25' which has a contour which fits for receiving the segments 81, 82, 83 of the clamping ring 8.

Figure 8B:
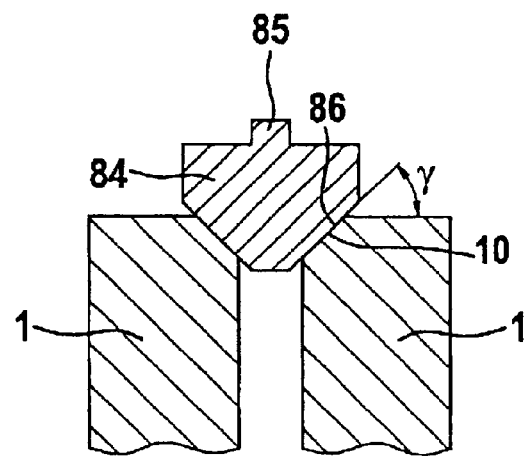

With the embodiment example shown in FIG. 8b the segments of the clamping rings 8 are arranged directly between the two clamping plates 1; the clamping wedges 2 here have been removed. The clamping plates 1 on their outer edge which face each other in each case comprise a chamfer 10. This chamfer 10 has the same angle γ as also the bevelling 86 of the spreader ring 8. By way of this the main body 84 of the segments 81, 82, 83 of the clamping ring 3 with the bevelling 86 rests flatly on the chamfer 10. By changing the distance between the clamping plates 1 with this the segments 81, 82, 83 of the spreader ring 8 are moved in the radial direction. By way of activating the actuation means 3 and by way of the change of the distance between the clamping plates 1 created by way of this, in the manner which has already been described a radial movement of the segments 81, 82, 83 of the spreader ring 8 may be effected in order thus to carry out an widening of the tube.

With a preferred variant the clamping wedges 2' are provided with rotary feet 220 on one side. For this the clamping wedges 2' comprise a passage opening 221 running from the inside to the outside which is provided with an inner thread and into which there is screwed an adjusting screw 222. The adjusting screw 222 at its outer end comprises a head 223 at its outer end. By way of rotating the adjusting screw 222 in the passage opening one may change the position of the adjusting screw 222 so that the distance of the head 223 to the outer side 22 of the clamping wedges 2' may be changed. Thanks to the adjusting screw 222 with the heads 223 one may also weld together those tubes which have a different inner diameter. The adjusting screw 22 is adjusted according to the difference of the diameter of the two tubes to be welded to one another so that the clamping wedge 2' on the side with the rotary foot 22 may be placed into the pipe with the larger diameter and on the side without the adjusting screw into the pipe with the smaller diameter.

Indeed with complicated welding locations, but also with others, it may be particularly advantageous if one creates an observation possibility for the welding location or the completeness and quality of the weld seam. With an advantageous embodiment form, for this, one of the clamping plates comprises an axial passage opening which has not been shown, into which there is applied an axially displaceable and rotatable camera housing in a flush manner. By way of displacing the camera housing towards the welding location with a complete revolution of the camera housing the whole length of the weld seam may be observed and inspected with regard to its quality. Preferably for this the camera additionally comprises an illumination means. So that the camera in the camera housing does not become damaged when welding, the camera housing is retracted into the clamping plate from the welding location when no observation is carried out. For transmitting the picture signals to a control monitor lying at the oustide one may provide a cable connection or a wireless transmission, for example by way of radio.

What is claimed is:

1. A clamping device for aligning and clamping pipe ends, comprising clamping plates which are arranged along an axis with clamping wedges which extend in an axial direction and which on a first side are mounted movable in a radial direction on the clamping plates, and on a second side having a contact surface for engaging with the pipe ends, a guide for guiding the clamping wedges on the clamping plates and an actuation device, wherein the guide comprises an elastic holder for holding the clamping wedges on the clamping plates.

2. A clamping device according to claim 1, the elastic holder comprises a spring-loaded ball which is arranged on the clamping plate and cooperates with the clamping wedges.

3. A clamping device according to claim 2, wherein the elastic holder further comprises a channel which is arranged on the clamping wedges and cooperates with the spring-loaded ball.

4. A clamping device according to claim 2, wherein the elastic holder further comprises a hollow bolt provided as a bearing for the spring-loaded ball.

5. A clamping device according to claim 2, wherein the guide is configured in the shape of guide grooves whose groove bases form oblique surfaces.

6. A clamping device according to claim 5, further comprising, in a region of the guide grooves, a tangential bore for accommodating the spring-loaded ball which with its one end ends in the guide groove and with its other end on a circumferential surface of the clamping plates.

7. A clamping device according to claim 1, wherein the clamping wedges comprise a copper-chrome-nickel alloy or stainless steel.

8. A clamping device according to claim 1, wherein on outer end faces of the clamping plates there are arranged seals which are designed for sealing cooperation with a surface of the pipe ends.

9. A clamping device according to claim 1, wherein on at least one of the clamping plates there is provided a forming gas conduit for leading supplied forming gas into a region between the clamping plates.

10. A clamping device according to claim 9, further comprising a connection plate having a connection and a passage opening for the forming gas to be supplied, which is connected by an annular channel to the forming gas conduit of the clamping plate.

11. A clamping device according to claim 9, comprising at least one bleed opening on one of the clamping plates without the forming gas conduit.

12. A clamping device according to claim 1, wherein the actuation device is a tension spindle.

13. A clamping device according to claim 1, wherein the actuation device is hydraulic.

14. A clamping device according to claim 1, wherein the clamping wedges are exchangeably held on the clamping plates.

15. A clamping device according to claim 5, further comprising a spreader ring having at least three segments and whose outer circumferential surface comprises a circumferential pressure saddle.

16. A clamping device according to claim 15, wherein the spreader ring comprises bevellings on its outer circumferential surface.

17. A clamping device according to claim 16, wherein the clamping plates comprises a chamfer at their edges cooperating with the clamping wedges whose angle $\gamma$ corresponds to that of the bevellings.

18. A clamping device according to claim 17, wherein the angle $\gamma$ is smaller than the angle of the oblique surface of the groove base of the guide grooves.

19. A clamping device set for aligning and clamping pipe ends of various sizes comprising clamping plates which are arranged at an axial distance to one another, clamping wedges which extend in axial direction and which on a first side are mounted movable in a radial direction on the clamping plates and on a second side have a contact surface for acting on the pipe ends, a guide for guiding the clamping wedges on the clamping plates and an actuation device, wherein the guide is provided with an elastic holding means for holding the clamping wedges on the clamping plates, and wherein the clamping wedges are exchangeable and there are provided several sets of clamping wedges which have differing distances from an inner to an outer side.

20. A clamping device set according to claim 19, wherein the clamping wedges are designed in a multi-piece form with a sliding piece on the clamping plate side and exchangeable tube-side attachment pieces of different size.

* * * * *